United States Patent

[11] 3,577,200

[72] Inventors Ralph E. Aldrich
Arlington;
Paul J. Caruso, Bedford, Mass.
[21] Appl. No. 759,360
[22] Filed Sept. 12, 1968
[45] Patented May 4, 1971
[73] Assignee Itek Corporation
Lexington, Mass.

[54] REAL-TIME SOLID STATE CAMERA SYSTEM
13 Claims, 1 Drawing Fig.

[52] U.S. Cl. ........................................................ 178/7.1, 350/150, 250/199
[51] Int. Cl. ........................................................ H04n 3/10
[50] Field of Search ............................................ 178/7.1, 7.1 (E); 350/150; 340/172; 250/199

[56] References Cited
UNITED STATES PATENTS
3,306,977 2/1967 Brueggemann............... 178/7.1

*Primary Examiner*—Robert L. Griffin
*Assistant Examiner*—Richard P. Lange
*Attorneys*—Homer O. Blair, Robert L. Nathans, W. Gary Goodson and Joseph S. Iandiorio

ABSTRACT: Camera apparatus is disclosed for sensing the pattern of modulation imposed by an electro-optic medium on radiation as a function of the electric field established across the electro-optic medium by the effect of a radiant image projected on a photoconductor medium associated with the electro-optic medium across which mediums an electric field has been established.

PATENTED MAY 4 1971 3,577,200
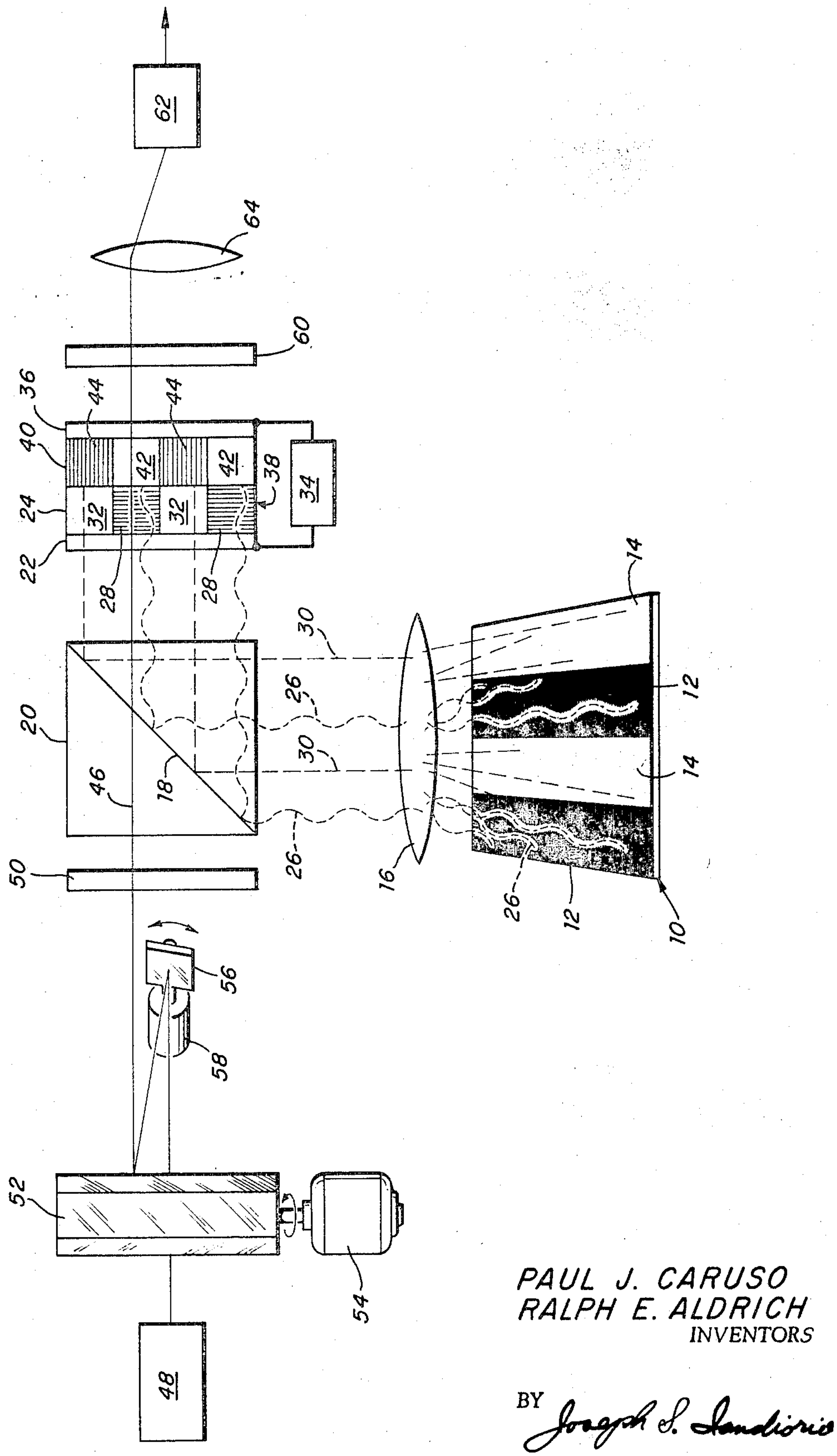
PAUL J. CARUSO
RALPH E. ALDRICH
INVENTORS
BY Joseph S. Iandiorio
ATTORNEY.

REAL-TIME SOLID STATE CAMERA SYSTEM

Characterization of Invention

The invention is characterized in a real-time solid-state camera system comprising: a photoconductor medium whose conductance varies as a function of the intensity of radiation incident on it; an electro-optic medium, exhibiting a characteristic that varies with variations of an applied electric field, associated with the photoconductor medium, for modulating radiation transmitted by the electro-optic medium as a function of an electric field associated with the mediums; means for exposing the photoconductor medium to a radiant image to vary the conductance of the photoconductor medium in a pattern similar to that radiant image; means for applying across the mediums an electric field which varies at the electro-optic medium as a function of the conductance pattern of the photoconductor medium; means for subjecting the electro-optic medium to radiation; a photosensitive medium; and, second means for exposing the photosensitive medium to a portion of the modulated radiation from the means for subjecting, transmitted by the electro-optic medium.

BACKGROUND OF INVENTION

This invention relates to a real-time solid-state camera system.

Conventional camera systems using camera tubes such as vidicons and orthicons tend to be large, heavy, complex and somewhat delicate becaUse of the size and arrangement of electrodes, deflection coils or plates and other required elements. Furthermore, such camera tubes have inherent operational limits: at maximum electron beam intensity if either the image resolution or the beam sweep speed is desired to be increased the other must be proportionately decreased in order to maintain the signal-to-noise ratio of the output signal. For example, as the size of the photosensitive spots scanned by the beam is reduced to provide improved resolution the intensity of the electron beam must be increased to keep constant the number of charges transferred to or from the photosensitive element under control of the beam as it encounters those spots. However, as the intensity of the electron beam is increased the beam becomes more difficult to focus so that the size of the beam approaches the size of the photosensitive spots to be scanned. As the beam size is reduced the beam sweep speed may be decreased to keep constant the charge transfer by having the beam encounter each spot for a slightly longer period of time. Similarly if it is desired to increase the beam sweep speed the image resolution may be partially sacrificed. The upper limit on the beam sweep speed presently appears to be approximately 4 megacycles.

SUMMARY OF INVENTION

Thus it is desirable to have available an improved real-time solid-state camera system.

It is also desirable to have available such a camera system which may be formed in a small, compact, simple, lightweight and rugged structure.

It is also desirable to have available such a camera system which is capable of very high speed and high resolution operation.

The invention may be accomplished by real-time solid-state camera system including a photoconductor medium associated with an electro-optic medium and means for supplying an electric field across those mediums. The photoconductor medium is exposed to the radiant image of an object so that the conductivity of the photoconductor medium, thus also the intensity of the electric field across the electro-optic medium, is varied as a function of that radiant image. The electro-optic medium is subjected to another source of radiation which upon being transmitted from the electro-optic medium bears a modulation, imposed by the electro-optic characteristic of the electro-optic medium, which is a function of the intensity of the electric field across the electro-optic medium. A photosensitive medium is exposed to a portion of the modulated radiation to create a representation of the radiant image.

DISCLOSURE OF PREFERRED EMBODIMENT

Other objects, features and advantages will occur from the following description of a preferred embodiment and the accompanying drawing, in which is shown a side view of a camera system according to this invention in which the object seen by the camera is a plate shown in perspective.

In one embodiment of the invention a beam of circularly polarized light is passed through a beam-merging prism simultaneously with the radiant image of a particular object so that both the beam and image are projected onto the photoconductor layer of an electro-optic photoconductor element. The image projected on the photoconductor layer varies the conductance of that layer in a pattern similar to the pattern of the intensity of that image: the conductance of a particular area increases as the intensity of the radiation of that particular area increases. A uniform electric field established through a pair of electrodes across the two layers is varied in a pattern similar to that of the radiant image by the variable conductance pattern of the photoconductor layer. The photoconductor layer has an absorption characteristic such that it absorbs substantially all of the radiation at the wavelength of the radiation from the radiant image but transmits substantially all of the radiation at the wavelength of the polarized light. The circularly polarized light exiting from any particular point on the electro-optic layer is modulated by an electro-optic characteristic of that layer in proportion to the strength of the electric field across that layer. For example, if that characteristic is birefringence the light which was circularly polarized on entering the electro-optic layer will emerge elliptically polarized. The elliptical field of the polarized light will be more eccentric emerging from points on the electro-optic layer corresponding to areas on the photoconductor layer receiving high intensity portions of the image and less eccentric emerging from points corresponding to areas receiving low intensity portions of the image. The elliptically polarized light is then submitted to an analyzer which selects a component of the light indicative of the eccentricity of the elliptical light field. That component is sensed by a photoelectric cell, or other photosensitive device, to produce an electrical signal representative of the modulation of the polarized light. Since that modulation is caused by the birefringence of the electro-optic layer under influence of the electric field established by the radiant image cast on the photoconductor layer, that electrical signal is a function of the intensity pattern of the radiant image cast on the photoconductor layer.

In the drawing there is shown a real-time solid-state camera system in which the object to be photographed is a plate 10 having alternate dark portions 12 and light portions 14. A lens 16 collects the light from plate 10 and directs it to half-silvered surface 18 of prism 20 from which the light is reflected through transparent electrode 22 to the photoconductor layer 24 which may be a material such as cadmium sulfide. Low intensity light 26 from dark portions 12 of plate 10 strikes areas 28 of layer 24 increasing their conductance only slightly, while high intensity light 30 from light portions 14 strikes areas 32 of layer 24 increasing their conductance substantially. A power source 34 applies a voltage between electrode 22 and electrode 36 which establishes a uniform electric field across element 38 which includes photoconductor layer 24 and electro-optic layer 40. The variation of the conductance of layer 24 causes a variation in the electric field strength across the electro-optic layer 40. If, for example, the electro-optic layer 40 is a material such as potassium dihydrogen phosphate ( K D P ), which exhibits birefringence under the influence of an electric field, the birefringence exhibited by sections 42 of layer 40 adjacent to lower conductance areas 28 of layer 24 will be more pronounced than that in sections 44 adjacent higher conductance areas 32.

If the material of the photoconductor layer 24 is selected to have an absorption characteristic such that it absorbs substantially all light of the wavelength of the light from plate 10, no light from plate 10 will penetrate the electro-optic layer 40. Real-time readout in the system is performed by a circularly polarized beam of light 46 provided as plane polarized light by laser 48 and circularly polarized by quarter wave plate 50.

Scanning action of the beam 46 is provided by reflecting prism 52 rotated about a vertical axis by motor 54 and by reflector or mirror 56 oscillated about a horizontal axis by motor 58. Rotating reflecting prism 52 sweeps the beam from laser 48 from side to side while mirror 56 sweeps that beam up and down. As a result beam 46 passing through surface 18 of prism 20 describes a two dimensional raster on element 38.

Laser 48 is selected to provide light of a wavelength which will be substantially wholly transmitted by layer 24 and layer 40. Upon emerging from layer 40 beam 46 will be elliptically polarized; the degree of elliptical eccentricity will depend on the strength of the electric field across layer 40 at the point where beam 46 passes through it. In sections 44 where the electric field is strong the birefringence induced therein is more manifest and the elliptical field of beam 46 will be highly eccentric. In sections 42 where the electric field is weaker the birefringence induced therein is less manifest and the elliptical field of beam 46 will be less eccentric; or perhaps it will be unaffected and emerge as it entered: circularly polarized.

Upon emerging from layer 40 beam 46 passes through a circular analyzer which may be a quarter wave plate 60 which selects a component of the elliptically polarized light indicative of its elliptical eccentricity. That component is focused on photoelectric cell 62 by lens 64 and the electrical signal from cell 62, representative of the modulation of beam 46, may be delivered to a receiver or reproduction device synchronized with the scanning arrangement of reflecting prism 52 and mirror 55 to provide a picture of plate 10.

In this manner a changing scene imaged on photoconductor layer 24 by lens 16 may be continuously readout in a real-time camera system, similar to those systems using image orthicon tubes and vidicon tubes but using a high speed, high resolution, beam of radiation to provide a camera system with a high signal-to-noise ratio output signal.

In other embodiments the electro-optic layer need not be birefringent but rather may exhibit some other characteristic which varies with the electric field across it to modulate the radiation transmitted by it. For example, the index of refraction parallel to the direction of radiation passing through the layer may vary with the electric field across it, so that the pattern of bending of the emerging radiation is representative of the electric field across the layer. The electro-optic material and photoconductor material need not be two separate materials but may be one material which exhibits both characteristics. The radiation to be modulated by the particular characteristic of the electro-optic material need not enter one side of that material and exit from the other. The modulation of the radiation by the electro-optic layer may be achieved by directing the radiation into that material from one side and reflecting it within that material so that the radiation is transmitted back out the same side. The radiation used to expose the photoconductor layer and that used to read out the electro-optic layer need not be visible light, nor need they be different wavelengths. The radiation used to read out the electro-optic layer may be one which is partially absorbed by the photoconductor layer so that the conductance of the photoconductor layer is increased during readout. Parallel as well as serial readout may be performed by simultaneously exposing the entire electro-optic layer to readout radiation and sensing at least a portion of the modulated output radiation with a sensitive film or plate, storage tube or other sensor. The source of plane polarized light may be other than a laser source and if the electro-optic layer is made of properly oriented crystals plane polarized light may be used instead of circularly polarized light.

Other embodiments will occur to those skilled in the art and are within the following claims:

We claim:

1. A real-time solid-state camera system comprising:
a photoconductor medium whose conductance varies as a function of the intensity of radiation incident on it;
an electro-optic medium, exhibiting a characteristic that varies with variations of an applied electric field, associated with said photoconductor medium, for modulating radiation transmitted by said electro-optic medium as a function of an electric field associated with said mediums;
means for exposing said photoconductor medium to a radiant image to vary the conductance of said photoconductor medium in a pattern similar to that radiant image;
means for applying across said mediums an electric field which varies at said electro-optic medium as a function of the conductance pattern of said photoconductor medium;
means for subjecting said electro-optic medium to radiation;
a photosensitive medium; and,
second means for exposing said photosensitive medium to a portion of the modulated radiation from said means for subjecting, transmitted by said electro-optic medium.

2. The system of claim 1 in which said electro-optic medium is a material whose birefringence varies as a function of an applied electric field.

3. The system of claim 1 in which said photoconductor medium and said electro-optic medium are two separate materials each exhibiting the characteristic of a different one of the mediums.

4. The system of claim 1 further including means for simultaneously directing the radiant image from said means for exposing and radiation from said means for subjecting to said electro-optic medium.

5. The system of claim 1 in which said means for exposing includes lens means for gathering radiation from an object and projecting the radiant image thereof to said photoconductor medium.

6. The system of claim 1 in which said means for subjecting includes a source of polarized radiation.

7. The system of claim 1 in which said means for subjecting includes laser source of radiation.

8. The system of claim 6 in which said source of polarized radiation includes circular polarizing means.

9. The system of claim 1 in which said means for applying an electric field includes a pair of electrodes and a source of electric power.

10. The system of claim 1 in which said photosensitive medium includes a photoelectric cell.

11. The system of claim 1 in which said means for subjecting scans said photoconductor medium with a beam of radiation in a predetermined raster.

12. The system of claim 1 in which said second means for exposing includes a circular analyzer.

13. The system of claim 1 in which said photoconductor medium absorbs substantially all the radiation of the radiant image and absorbs substantially none of the radiation from said means for subjecting.